US012753048B2

(12) United States Patent
Christen

(10) Patent No.: US 12,753,048 B2
(45) Date of Patent: Oct. 6, 2026

(54) ELEVATOR

(71) Applicant: Inventio AG, Hergiswil (CH)

(72) Inventor: Jules Christen, Altdorf UR (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/878,112

(22) PCT Filed: Jun. 14, 2023

(86) PCT No.: PCT/EP2023/065877
§ 371 (c)(1),
(2) Date: Dec. 23, 2024

(87) PCT Pub. No.: WO2024/002686
PCT Pub. Date: Jan. 4, 2024

(65) Prior Publication Data

US 2025/0382157 A1 Dec. 18, 2025

(30) Foreign Application Priority Data

Jun. 29, 2022 (EP) .................................... 22182055

(51) Int. Cl.
*B66B 13/24* (2006.01)
*B66B 13/16* (2006.01)

(52) U.S. Cl.
CPC ............ *B66B 13/24* (2013.01); *B66B 13/165* (2013.01)

(58) Field of Classification Search
CPC ....... B66B 13/28; B66B 13/24; B66B 13/245; B66B 13/20
See application file for complete search history.

(56) References Cited

U.S. PATENT DOCUMENTS 8,820,485 B2 9/2014 Umbaugh
11,124,385 B2 9/2021 Mauguen et al.
11,124,388 B2 9/2021 Birrer et al.
(Continued)

FOREIGN PATENT DOCUMENTS

JP 2003335483 A * 11/2003
JP 2009113915 A * 5/2009
(Continued)

OTHER PUBLICATIONS

Machine Translation of KR 10-1929263.*

*Primary Examiner* — Diem M Tran
(74) *Attorney, Agent, or Firm* — Shumaker, Loop & Kendrick, LLP

(57) ABSTRACT

A method enables emergency unlocking of a car door of an elevator having a car movable within a shaft to a floor. The car door has an electrically activatable lock and the floor has a shaft door with an electrically activatable door lock. The car door lock has a first latch for locking a first car door leaf and an emergency unlocking mechanism. The shaft door lock can be accessed from the floor. An actuator is attached to the shaft door. The method includes the steps: the shaft door is unlocked from the floor by the shaft door lock being manually actuated; actuation of the shaft door lock moves the actuator from a first position to a second position; in the second position, the actuator actuates the emergency unlocking mechanism; and actuation of the emergency unlocking mechanism unlocks the car door lock to unlock the first car door leaf.

15 Claims, 5 Drawing Sheets

(56) References Cited

U.S. PATENT DOCUMENTS

| | | | | |
|---|---|---|---|---|
| 2004/0206582 | A1 | 10/2004 | Tonoki et al. | |
| 2008/0078628 | A1 * | 4/2008 | Christen | B66B 13/20<br>187/319 |
| 2016/0214836 | A1 | 7/2016 | Haikonen | |
| 2017/0355569 | A1 | 12/2017 | Wang | |
| 2020/0115192 | A1 | 4/2020 | Montigny et al. | |

FOREIGN PATENT DOCUMENTS

| | | | | | |
|---|---|---|---|---|---|
| KR | 101929263 | B1 | * | 12/2018 | B66B 13/20 |
| WO | WO-2013140575 | A1 | * | 9/2013 | B66B 13/16 |
| WO | 2017016896 | A1 | | 2/2017 | |
| WO | WO-2023053320 | A1 | * | 4/2023 | B66B 13/16 |

* cited by examiner

ELEVATOR

FIELD

The present invention relates to an elevator and to a method for emergency unlocking a car door of an elevator.

BACKGROUND

In an elevator, a car is typically moved vertically within a shaft between different floors or levels of a building. On the floors, passengers can enter and exit the car or load or unload other loads to be transported into and from the car. In order to allow access to the car, shaft doors are arranged on the floor and the car also has a car door. The car door and the shaft door collectively form an openable and closable passage from the car to the floor, or vice versa. So that that the car door remains securely closed while traveling, the car door has a car door lock that locks one or more car door leaves while traveling. The shaft door also has a shaft door lock that keeps one shaft door leaf or the plurality of shaft door leaves locked, at least in the absence of the car.

The car door also has a drive that is designed to open and close the car door leaves. Typically, this movement of the car door leaves is transmitted by means of a door coupling to the shaft door to be opened in each case on the floor that is visited. For this purpose, a car door coupling engages in a shaft door coupling, which collectively form the door coupling. The shaft door coupling often has at least one roller that rolls along at least one coupling guides. Alternatively, this can be the other way around.

Typically, the door coupling can also unlock a shaft door lock. U.S. Pat. No. 8,820,485 B2, for example, discloses a known door coupling which unlocks a shaft door leaf by spreading the door coupling and the door coupling also transmits a car door movement to the shaft door leaves. For this purpose, the door coupling has a mechanism that uses a movement of the car door drive to unlock the car door. However, such mechanisms are complicated, expensive and susceptible to faults.

EP3328769A1 discloses an electric actuator for unlocking a car door. Such an electric drive requires electrical energy to unlock the door. Such an actuator thus does not work in the event of a power failure. In the event of a power failure, the car can be moved to a floor using known procedures. However, the car door cannot be unlocked and the passengers remain trapped in the car.

SUMMARY

Therefore, one object can be considered that of providing emergency unlocking that allows a car door locked by an electric lock to be unlocked directly from the floor even in the event of a power failure.

According to a first aspect of the invention, the object is achieved by an elevator. The elevator has a car that can move within a shaft and moves to at least one floor. The car has a car door with at least a first car door leaf, and the elevator has a shaft door with at least a first shaft door leaf. The car door has an electrically activatable car door lock, and the shaft door has an electrically activatable shaft door lock. The car door lock has a first latch for locking the first car door leaf. The shaft door has a lock that can be accessed from the floor and allows the shaft door to be unlocked from the floor. The lock can be actuated manually. The car door lock has an emergency unlocking mechanism, and the emergency unlocking mechanism is operatively connected to at least the first latch of the car door lock. An actuator is attached to the shaft door, which can be moved from a first position to a second position by moving a key in the lock. As a result, the emergency unlocking mechanism can be actuated; by actuating the emergency unlocking mechanism, the first latch can be brought into an unlocked position and the car door lock can thereby be unlocked in order to unlock the first car door leaf.

According to a second aspect of the invention, the object is achieved by a method for emergency unlocking a car door of an elevator. The elevator has a car that can move within a shaft and moves to at least one floor. The car has a car door with at least a first car door leaf, and the elevator has a shaft door with at least a first shaft door leaf. The car door has an electrically activatable car door lock, and the shaft door has an electrically activatable shaft door lock. The car door lock has a first latch for locking the first car door leaf and an emergency unlocking mechanism. The shaft door has a lock that can be accessed from the floor. An actuator is attached to the shaft door.

The method comprises the following steps:

- the shaft door is unlocked from the floor by the lock being manually actuated,
- the actuation of the lock moves the actuator from a first position to a second position,
- when the second position is reached, the actuator actuates the emergency unlocking mechanism, and
- the actuation of the emergency unlocking mechanism unlocks the car door lock in order to unlock the first car door leaf.

Possible features and advantages of embodiments of the invention can be regarded, inter alia and without limiting the invention, as being based upon the concepts and findings described below.

The travel path of an elevator comprises the space through which the car travels during its journey to the floors. It can extend inside a building or outside a building. The shaft doors separate the travel path from the space on the floor. As a result, it prevents people from falling.

As a result of the invention, a service technician, or any other person familiar with operating the elevator, can free passengers who are locked in the elevator. For this purpose, the service technician inserts a suitable key into the shaft door lock to unlock the shaft door. The key and the lock can be designed in such a way that even just inserting the key into the lock moves the actuator into the second position.

According to a preferred embodiment, the emergency unlocking method further comprises the following steps:

- inserting a key into the lock,
- turning the key preferably by at least 20°, and
- unlocking the car door by the actuator actuating the emergency unlocking mechanism on the car door lock by the key being turned.

The key is preferably designed as a triangular key. However, the key can also be a construction key. This can be seen as an advantage, since these types of keys are widely used, meaning that many people own such a key. In an emergency, many people will therefore be able to rescue the passengers from the car. However, it is also possible to design the lock in such a way that it has a cylinder lock that requires a special suitable key to open it. This can be seen as an advantage, because it can ensure that only authorized persons can enter the shaft.

The shaft door is preferably unlocked via a mechanical operative connection between the lock and the shaft door lock, such that the movement of the key in the lock causes the shaft door to be unlocked. However, in contrast to the emergency opening on the car, such connections are designed as permanent connections, since the shaft door lock is permanently attached to the shaft door. Such a direct connection can be formed, for example, by means of a tension rod, a pressure rod, a Bowden cable or a lever.

The movement of the key in the lock causes the actuator attached to the shaft door to also move from the first position to a second position. The travel movement can, for example, be in the form of a linear displacement, such as when extending a cylinder. Alternatively, the travel movement can be arc-shaped, as could be achieved, for example, by being guided by a parallelogram. The actuator is moved into the second position directly by the movement of the key in the lock or by the transmission of this movement, for example by means of a connecting rod. In the second position, the actuator is preferably in contact with the emergency unlocking mechanism and actuates the emergency unlocking mechanism. The emergency unlocking mechanism can have a push-piece to which the actuator can apply pressure. Furthermore, the emergency unlocking mechanism can have a link that can be actuated by the actuator. The movement of the push-piece or the link can be transmitted to the car door lock, for example, by a lever, a connecting rod or a Bowden cable. The emergency unlocking mechanism is therefore operatively connected to the first latch of the car door lock.

The door leaves can be designed, for example, as rolling doors or as folding doors. Preferably, the door leaves are part of a sliding door, i.e. designed as solid plate-like bodies that are moved horizontally, perpendicularly to a doorway.

According to a preferred embodiment, the emergency unlocking mechanism is designed as an emergency unlocking lever. The emergency unlocking lever can be designed as a rod or tube that is directly connected to the car door lock. Pressure exerted by the actuator on the emergency unlocking lever results in a movement of the emergency unlocking lever, which leads to a movement of the car door lock and in particular the first latch. The emergency unlocking lever is therefore operatively connected to the first latch of the car door lock. This is a cost-effective embodiment, since such an elevator has only a few additional components.

The first car door latch engages with a hook on the first car door leaf, which is locked by this engagement of the latch.

The movement of the actuator can therefore lead to a movement of the car door lock in several ways, and this movement leads to the car door leaf being unlocked.

Both the first shaft door leaf and the first car door leaf can thus be unlocked by actuating the key in the lock. This has the advantage that the shaft door and the car door can now be collectively opened. The first car door leaf and the first shaft door leaf are connected to one another by the door coupling; only when both are unlocked can the shaft door and the car door be collectively opened. The passengers can thus now leave the car.

According to a preferred embodiment, the actuator is at a distance from the clearance profile of the car in the first position.

The clearance profile of the car describes the space that the car covers when traveling. The fact that the actuator is at a distance from the clearance profile of the car in the first position ensures that it does not touch the car when passing it. Preferably, the actuator is arranged in a cavity or pocket in the door lintel above the first shaft door leaf. In the first position, the actuator can be arranged exactly vertically above the first door leaf, or it can have a horizontal offset. As a result, the actuator is protected from falling dirt in the shaft.

According to a preferred embodiment, the actuator bridges a distance between the shaft door and the car door in the second position. As a result, the actuator can enter into an operative connection with the emergency unlocking mechanism. The distance is preferably bridged by means of the actuator designed as a mechanical element.

According to a preferred embodiment, the car door has a second car door leaf, which can be locked by a second latch, and the emergency unlocking mechanism also brings the second latch into an unlocked position.

According to a preferred embodiment, the shaft door also has a second shaft door leaf.

According to a preferred embodiment, the method for emergency unlocking a car door further comprises the step of:

a second car door leaf is unlocked by actuating the emergency unlocking mechanism.

The elevator can therefore have a second car door leaf and optionally also a second shaft door leaf. Preferably, there are the same number of car door leaves as shaft door leaves per floor. With a plurality of smaller door leaves, the opened door requires less space than with one large door leaf and, for a given elevator car, a larger area can be used as the door passage opening.

The door leaves, i.e. the car door leaves and/or the shaft door leaves, can move telescopically. This means that the movement of the first and second car door leaf occurs in the same direction in each case, the first car door leaf moving faster, preferably twice as fast as the second car door leaf. Alternatively, the first and second car door leaves can also move so as to open in the center, i.e. the first car door leaf and the second car door leaf move away from one another in opposite directions from a door gap located in the middle of the car door during opening.

According to a preferred embodiment, the actuator is designed as a lever, which is rotated in a horizontal plane by the key being turned. In a simple embodiment, the actuator can thus be designed as a lever, which is preferably directly attached to the shaft door lock. The lever can be designed as a metal strip, rod or tube. The actuator then rotates in a horizontal plane, with the axis of rotation of the rotational movement being aligned vertically.

According to a preferred embodiment, the method for emergency unlocking a car door further comprises the following step of:

the turning of the key directly causes a rotation of the actuator.

The rotation of the actuator is a special case of the travel movement. During rotation, the actuator rotates about an axis of rotation that is fixed in space.

For this purpose, the actuator and the key in the lock preferably have a common axis of rotation. This has the advantage that the actuator is directly rigidly connected to the lock. As a result, no additional bearings or mechanisms are required to transmit the movement of the key to a movement of the actuator.

According to a preferred embodiment, the actuation includes applying pressure to the emergency unlocking lever. Preferably, the actuator thus presses on the emergency unlocking mechanism by substantially applying pressure. Alternatively, the actuation can also be carried out via a magnetic force, for example. For this purpose, either the actuator or the emergency unlocking mechanism has a magnet. The other component of the actuator or emergency unlocking mechanism is made of a ferromagnetic material or at least some thereof is made of ferromagnetic material. The magnet then serves to attract the ferromagnetic part, provided that a distance is reduced by actuating the key in the lock, and to unlock the car door lock through the increasing force of attraction.

Alternatively, the emergency unlocking mechanism and the actuator can both have a magnet. These magnets can be polarized in such a way that they repel one another when they move closer as a result of the actuation of the key in the lock. This repulsive force can also actuate the emergency unlocking mechanism.

According to a preferred embodiment, the car door lock has a rotor, which is mounted so as to rotate about an axis.

This axis is preferably aligned horizontally. A horizontal axis can easily be aligned vertically on the vertical car wall. In addition, the movement takes place within a narrow region, which is preferably aligned parallel to the first car door leaf. Since this region is narrow, the car door lintel can be slim, thus leaving more space for a car interior.

According to a preferred embodiment, the first latch and the emergency unlocking mechanism are rigidly connected to the rotor. Thus, the car door lock substantially consists of a single, movably mounted body. This has the advantage that additional joints or mechanisms are no longer required.

The emergency unlocking lever and the first latch can optionally be combined to form a common component. For example, the first latch and the emergency unlocking lever can thus be machined from a single workpiece, preferably a piece of sheet metal. Optionally, the same component can also have a part that acts as a tension weight or to which the tension weight can be fastened. Optionally or alternatively, the second latch can be formed on the same component.

According to a preferred embodiment, the rotor has a pretensioner, such that the first latch is pretensioned by the pretensioner toward a locked position.

As a result, the first latch is securely held in engagement with the first car door leaf. The first car door leaf can therefore only be unlocked intentionally by either the car door lock drive or the emergency unlocking mechanism opening the lock. A pretensioner can be designed, for example, as a tension spring, as a pressure spring, as a torsion spring or as a tension weight.

Further advantages, features, and details of the invention can be found in the following description of embodiments and with reference to the drawings, in which like or functionally like elements are provided with identical reference signs. The drawings are merely schematic and are not to scale.

DETAILED DESCRIPTION

Figure 1:
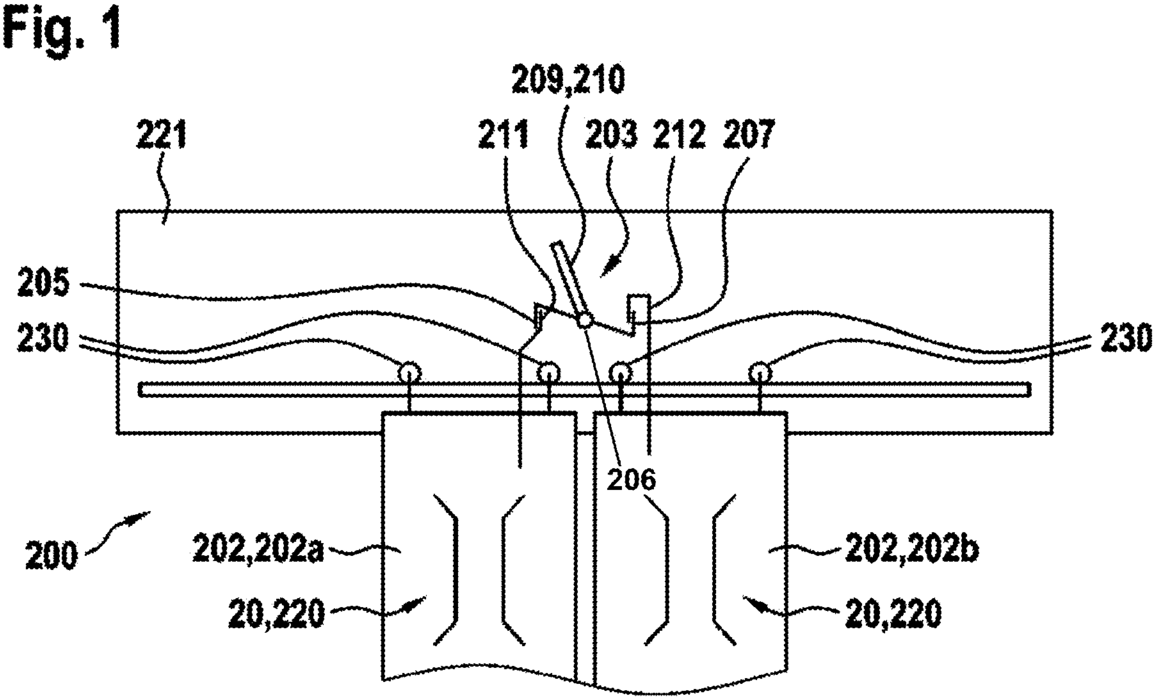
FIG. 1 is a front view of an upper part of a car door.

FIG. 1 shows the car door 200 with a first door leaf 202, 202*a* displaceably fastened thereto and a second door leaf 202, 202*b* displaceably fastened thereto in the closed state. The rollers 230 serve to mount the door leaves 202 such that they can be displaced on the door lintel 221 with low friction. The first door leaf 202*a* has a first door hook 211, into which a first latch 205 can engage in order to lock the first door leaf in the closed position. The second door leaf 202*b* similarly has a second door hook 212, into which a second latch 207 can engage in order to lock the second door leaf in the closed position.

In order to unlock the two door leaves 202, the first latch 205 and the second latch 207 can be rotated collectively at a rotor 206 as one body in a clockwise direction, so that the first latch 205 releases the first car door hook 211 of the first car door leaf 202*a* and the second latch 207 releases the second car door hook 212 of the second car door leaf 202*b*. As a result, both door leaves 202 can be moved and thus opened by a door drive or manually by a service technician. The movement of the car door leaves 202 is transmitted by the car door couplings 20, 220 to the shaft door couplings 120 (see FIG. 4). Normally, unlocking is carried out by an electric car door lock drive 201 (see FIG. 3 or FIG. 4).

In the event of a power failure, the door drive will not work. In this case, the car door lock 203 can be unlocked by an emergency unlocking mechanism 209 of the car door 200. The emergency unlocking mechanism 209 is designed as an emergency unlocking lever 210. By applying pressure, i.e. the actuator force 500 (see FIG. 5*a*) from left to right to the emergency unlocking lever 210, the lever is rotated. As a result, the latches of the door lock 203 rotate, as shown by the arrow R in FIG. 2, and the car door leaves 202 are unlocked or released for movement.

Figure 3:
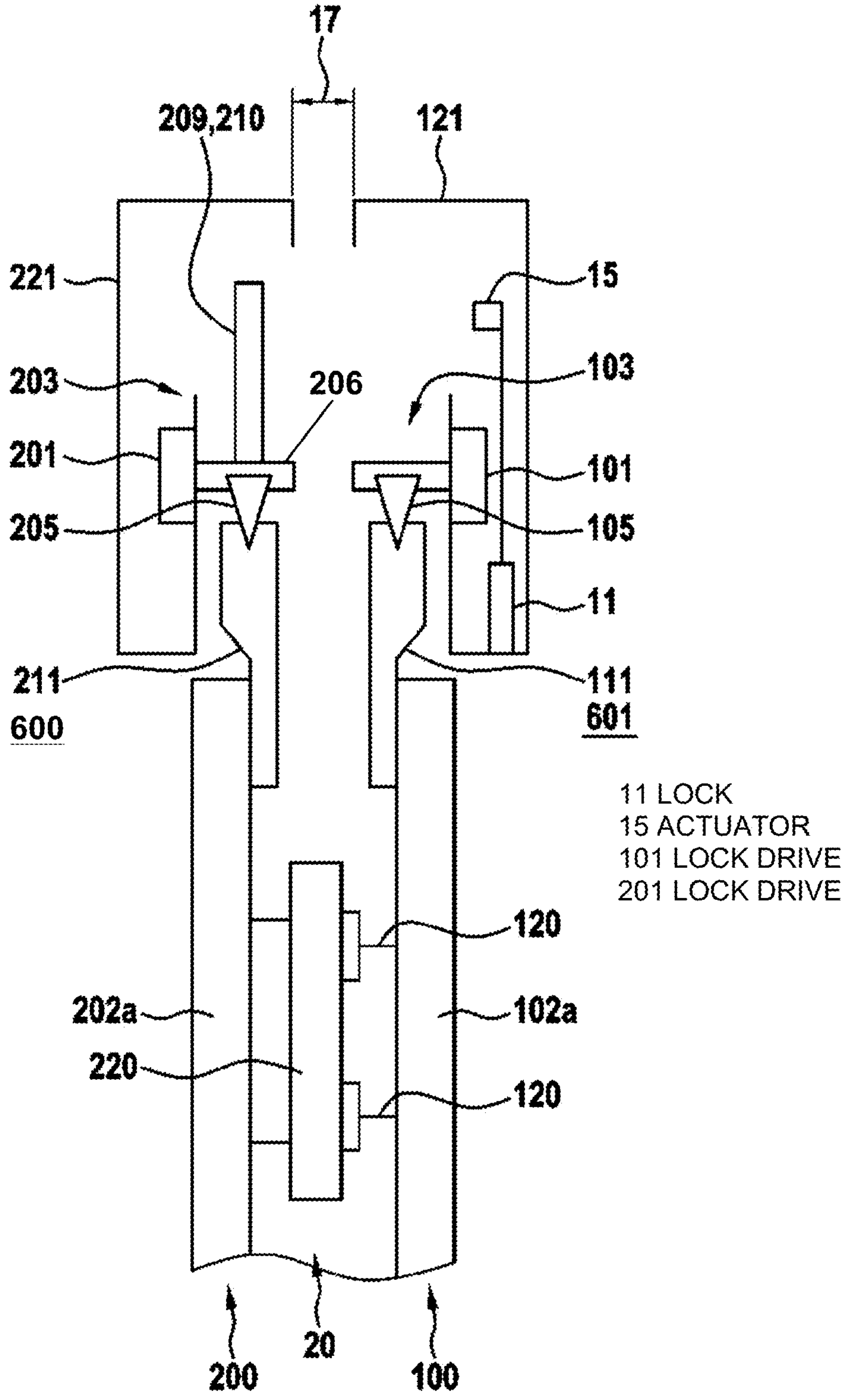
FIG. 3 is a side view of the same embodiment as in FIG. 1.

FIG. 3 is a side view of a situation in which the car 600 stops at a floor 601 and therefore the car door 200 and shaft door 100 are opposite one another at the same height. The rollers are not shown in FIG. 3. The shaft door 100 and the car door 200 substantially are at a predetermined distance 17 from one another. The distance 17 is only not maintained in the region of the door coupling 20, where a shaft door coupling 120 engages with a car door coupling 220. The shaft door coupling 120 and the car door coupling 220 engage with one another, such that the first car door leaf 202*a* and the first shaft door leaf 102*a* collectively move. In addition, vertical movement of the car 600 is made possible by the shape of the shaft door coupling 120 and the car door coupling 220. The door coupling 20 causes the first shaft door leaf 102*a* on the floor 601 to be moved together with the first car door leaf 202*a*. The car door leaf 202*a* is locked as described and shown in FIG. 1. The first shaft door leaf 102*a* is also locked by means of a hook 111 of the first shaft door leaf 102*a* and a first shaft door latch 105. The car door lock 203 is driven by the electric car door lock drive 201 and can thus unlock the first car door leaf 202*a*. The shaft door lock 103 is driven by the electric shaft door lock drive 101 and can thus unlock the first car door leaf 102*a*. The car door lock 203 is attached to the car door lintel 221. The shaft lock 103 is attached to the shaft door lintel 121. A lock 11 and the actuator 15 are arranged in the shaft door lintel 121 in such a way that the actuator 15 is at a distance from the clearance profile of the car in the first position. The actuator 15 is also protected from dirt or falling objects in the shaft door lintel 121.

Figure 2:
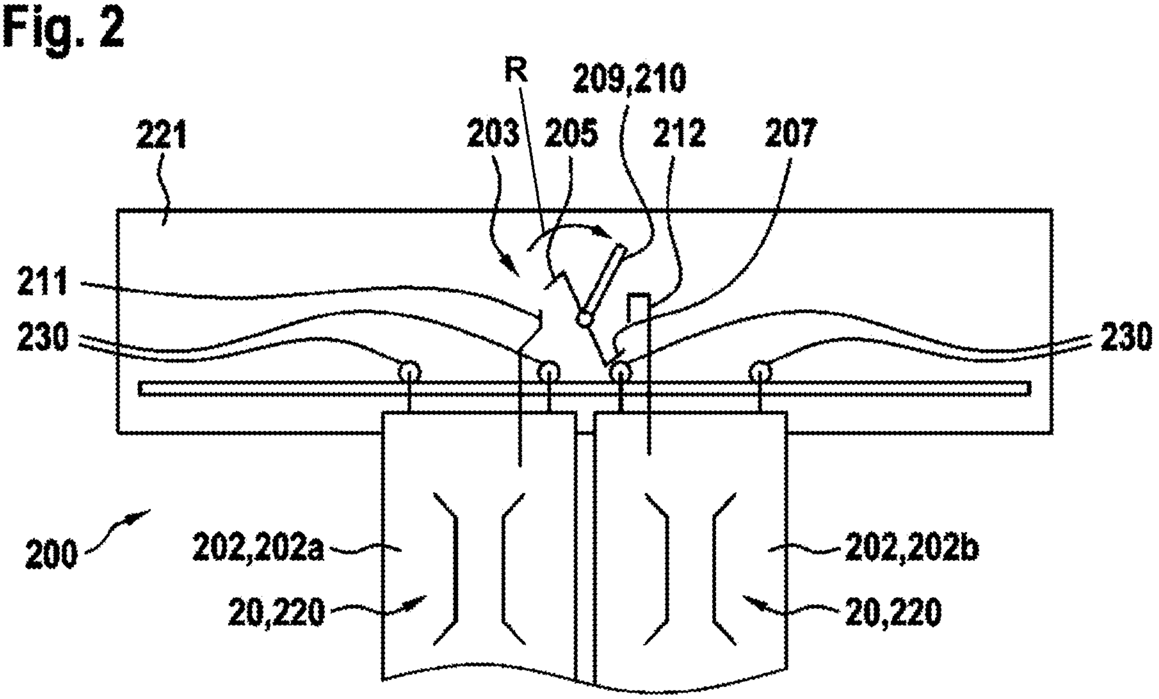
FIG. 2 shows the same embodiment as FIG. 1 with the car door lock unlocked.
Figure 4:
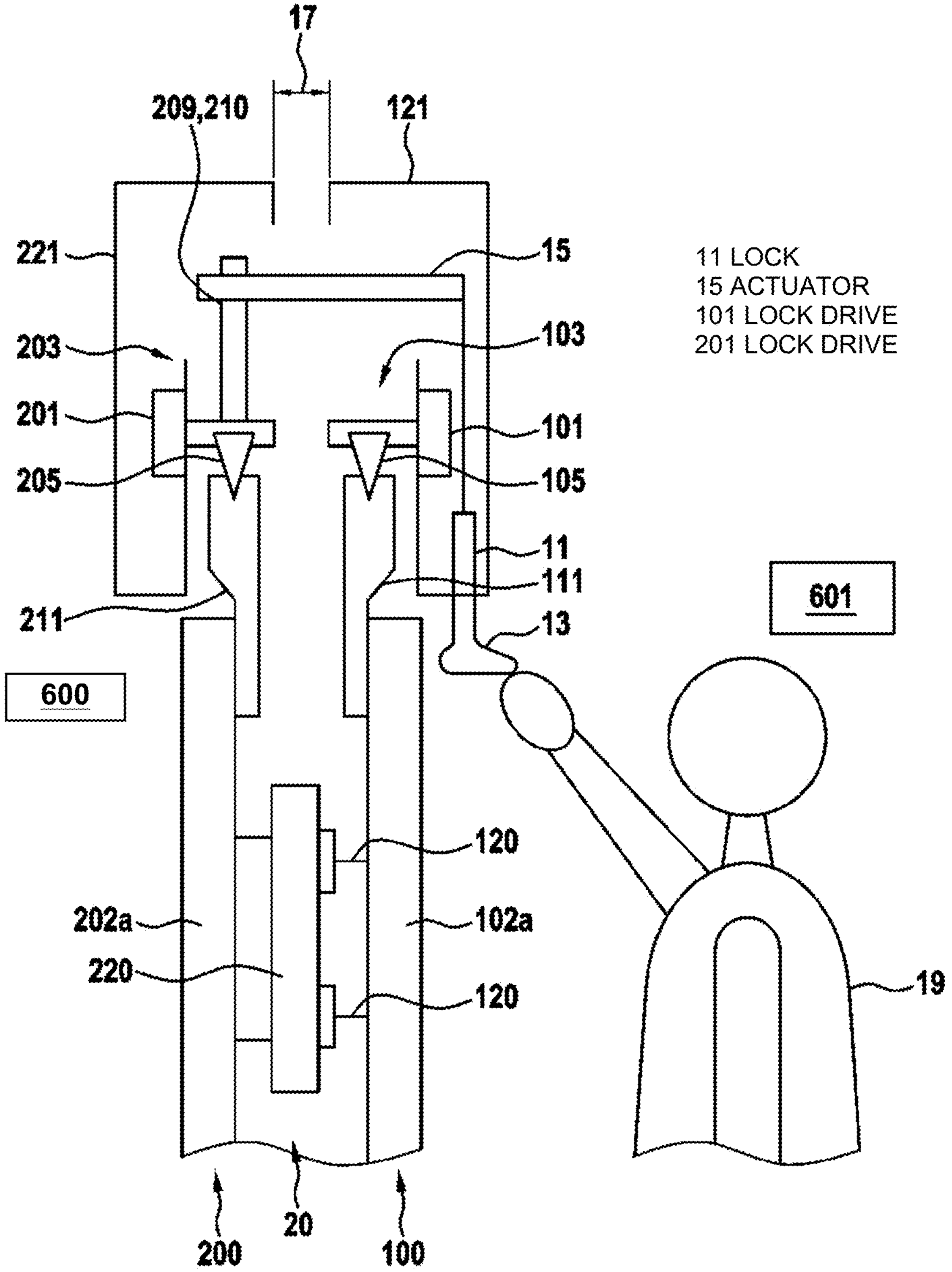
FIG. 4 is a side view of the same embodiment as in FIG. 1 in combination with a shaft door when actuating the shaft door lock.

FIG. 4 shows the same embodiment as FIG. 1 and FIG. 3 but in a situation in which the actuator 15 is just touching the emergency unlocking lever 210, i.e. immediately before the lock is opened. The first car door lock latch 205 remains locked. FIG. 4 shows the situation in which a service technician 19 opens the shaft door 100 and a car door 200 therebehind in order to free passengers from the car 600. For this purpose, the service technician 19 inserts the key 13 into the lock 11. The key 13 can be turned in the lock 11. The turning motion of the key 13 is transmitted to the actuator 15, which can now bridge the distance 17 to the car door lintel 221 due to a long lever arm. In the car door striker lintel 221, the actuator 15 presses the emergency unlocking lever 210. The actuator 15 and the key 13 in the lock 11 have a common axis of rotation. Therefore, there is no need to transmit the movement to a transmission or linkage. In FIG. 2, the movement of the car door lock 203 caused by the actuator 15 is shown by the rotation arrow R.

The shaft door lock 103 is also unlocked when the key 13 is turned. This can be achieved in the traditional manner (not shown) via a lasting mechanical connection between the lock 11 and the shaft door lock 103. This connection can, for example, occur as a connecting rod that directly or indirectly connects the lock 11 to the shaft door lock 103. Alternatively, however, the shaft door lock 103 can also have a separate emergency unlocking mechanism, such as a separate emergency unlocking lever. As a result, in an emergency, the car door 200 and the shaft door 100 are unlocked in the same way.

Figure 5A:
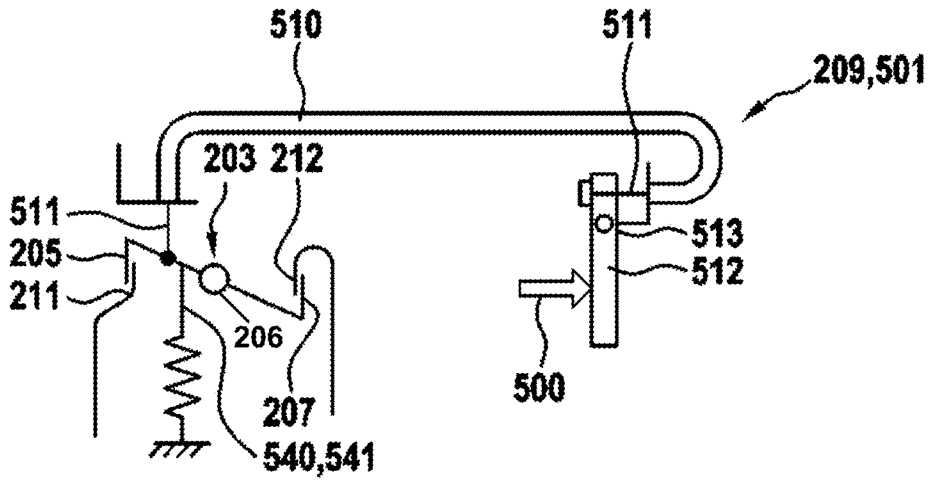
FIGS. 5*a* to 5*c* show further variants of the design of the emergency unlocking mechanism.
Figure 5B:
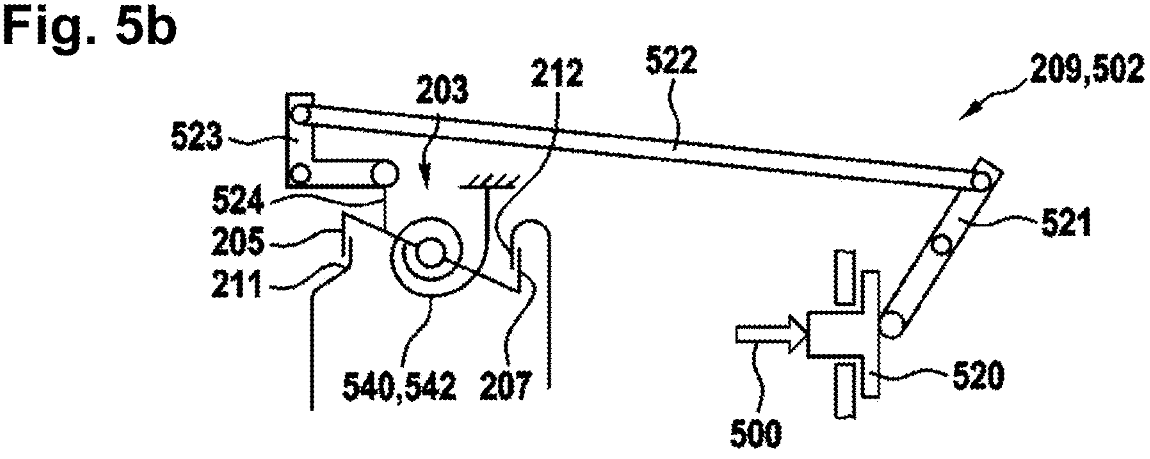
Figure 5C:
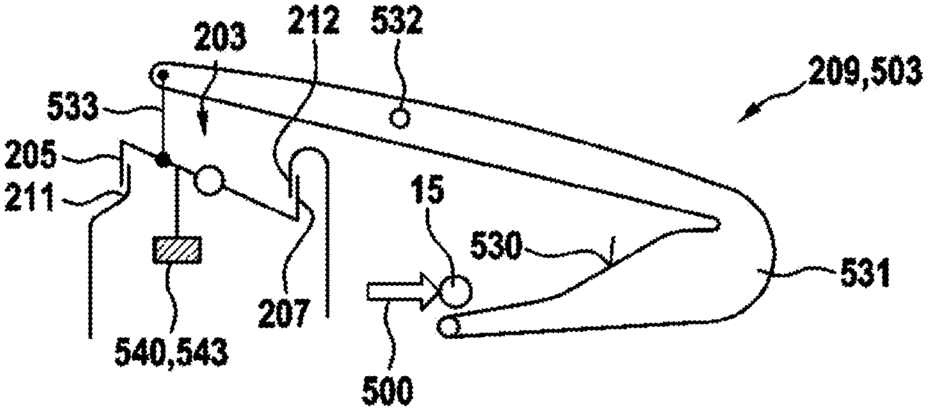

FIG. 5*a* through FIG. 5*c* show further alternative variants for the design of the emergency unlocking mechanism 209 and, independently thereof, various design variants for a pretensioner 540. The car door lock 203, the first car door latch 205, the second car door latch 207, the first car door hook 211 and the second car door hook 212 in each case have the same design. Likewise, an actuator force 500 is always applied. This is the pressure that the actuator 15 (see FIG. 4) applies to the emergency unlocking mechanism 209.

FIG. 5*a* shows the use of a Bowden cable 501. The actuator force 500 presses on a Bowden cable lever 512. On the side opposite the bearing 513 of the Bowden cable lever 512, the Bowden cable lever 512 pulls on a pull cable 511 when actuated. The pull cable is guided in a hose or tube 510 to the car door lock 203. The pull cable 511 is connected to the car door lock 203 in such a way that a pulling movement on the pull cable 511 unlocks the car door lock 203. The pretensioner 540 tensions the pull cable 511, so that the emergency unlocking mechanism 209 is moved back to its original position when the actuator force 500 is not applied.

The pretensioner 540 is shown in FIG. 5*a* as a tension spring 541. Alternatively, a pressure spring could also be installed. This would then have to be installed on the other side, so that its force has the same effect.

FIG. 5*b* shows an emergency unlocking linkage 502. The actuator force 500 presses on a push-piece 520, which in turn presses on a first linkage lever 521. The movement is transmitted to the car door lock 203 via the linkage connecting rod 522, a linkage bracket 523 and a pull wire 524.

The use of the push-piece 520 is optional. It is also possible to apply the actuator force 500 directly to the first linkage lever 521, thus omitting the push-piece 520.

The pretensioner 540 is designed as a torsion spring 542 in FIG. 5*b*.

FIG. 5*c* shows an emergency unlocking link system 503. The actuator force 500 of the actuator 15 acts on a link surface. In this case, a link lever 531 is made to rotate about a link pivot point 532. This rotation sets the car door lock 203 in motion via a pull wire 533 and unlocks the car door leaves 202.

The pretensioner 540 is designed as a tension weight 543 in FIG. 5*c*.

Figure 6:
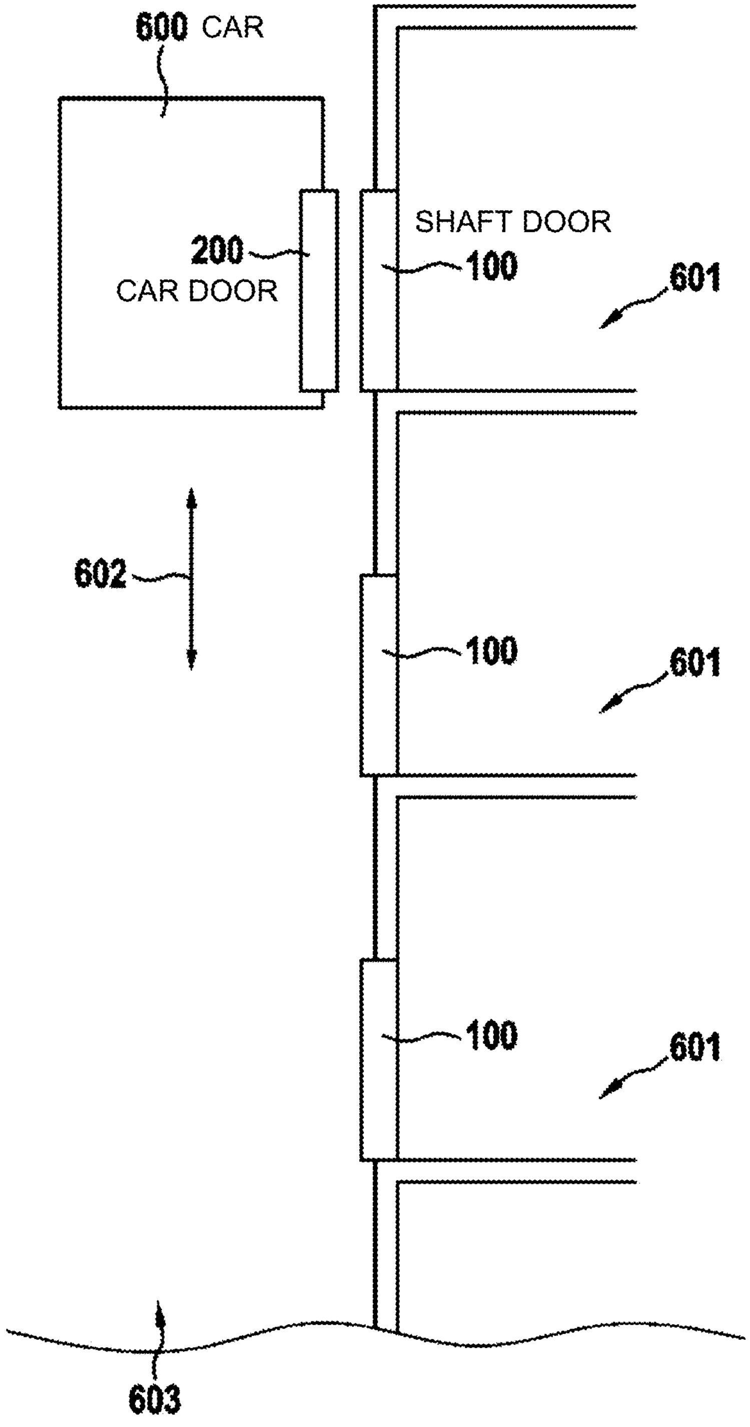
FIG. 6 shows an elevator comprising the car door and a plurality of shaft doors.

FIG. 6 shows a car 600 having a car door 200. This car can move in a shaft 603 in a travel direction 602. The travel direction 602 is aligned vertically. The car 600 travels to a plurality of floors 601. The floors 601 are separated from the shaft 603 by shaft doors 100.

Finally, it should be noted that terms such as “having,” “comprising,” etc., do not preclude other elements or steps, and terms such as “a” or “one” do not preclude a plurality. Furthermore, it should be noted that features or steps which have been described with reference to one of the above exemplary embodiments may also be used in combination with other features or steps of other exemplary embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator including an elevator car movable in an elevator shaft to a floor, the car having a car door with at least a first car door leaf, the elevator shaft having a shaft door with at least a first shaft door leaf at the floor, the car door having an electrically activatable car door lock and the shaft door having an electrically activatable shaft door lock, the car door lock having a first latch locking the first car door leaf, the shaft door having a lock locking the shaft door, the shaft door lock being accessible from the floor and manually actuable for unlocking the shaft door lock from the floor, the elevator comprising:

the car door lock having an emergency unlocking mechanism operatively connected to the first latch of the car door lock;

an actuator attached to the shaft door and being movable from a first position to a second position by moving a key in the shaft door lock, the actuator actuating the emergency unlocking mechanism in the second position to bring the first latch into an unlocked position thereby unlocking the car door lock and the first car door leaf;

wherein the shaft door and the car door are spaced apart a predetermined distance from one another in a region of a door coupling, the door coupling having a shaft door coupling that engages with a car door coupling such that the first car door leaf and the first shaft door leaf move collectively;

wherein the first shaft door leaf is locked by a hook of the first shaft door leaf engaging a first shaft door latch;

wherein the car door lock is driven by an electric car door lock drive to unlock the first car door leaf;

wherein the shaft door lock is driven by an electric shaft door lock drive to unlock the first shaft door leaf;

wherein the car door lock is attached to a car door lintel and the shaft door lock is attached to a shaft door lintel; and the shaft door lock and the actuator are arranged in the shaft door lintel such that the actuator in the first position is spaced at least the predetermined distance from a clearance profile of the car.

2. The elevator according to claim 1 wherein the emergency unlocking mechanism includes an emergency unlocking lever moved by the actuator.

3. The elevator according to claim 1 wherein the actuator bridges the predetermined distance between the shaft door and the car door in the second position of the actuator.

4. The elevator according to claim 1 wherein the car door has a second car door leaf locked by a second latch and the emergency unlocking mechanism in the second position brings the second latch into an unlocked position.

5. The elevator according to claim 4 wherein the shaft door has a second shaft door leaf.

6. The elevator according to claim 1 wherein the actuator includes a lever that is rotated in a horizontal plane by turning the key in the shaft door lock.

7. The elevator according to claim 1 wherein the movement of the actuator applies a pressure force to the emergency unlocking mechanism.

8. The elevator according to claim 1 wherein the car door lock has a rotor that rotates about an axis, the first latch and the emergency unlocking mechanism being attached to the rotor.

9. The elevator according to claim 8 wherein the first latch and the emergency unlocking mechanism are rigidly connected to the rotor.

10. The elevator according to claim 8 including a pretensioner connected to the rotor that pretensions the first latch toward a locked position.

11. A method for emergency unlocking the car door of the elevator according to claim 1, the method comprising steps of:

unlocking the shaft door from the floor by manually actuating the shaft door lock;

moving the actuator from a first position to the second position by the actuation of the shaft door lock;

the actuator actuating the emergency unlocking mechanism upon the actuator reaching the second position; and the actuation of the emergency unlocking mechanism unlocking the car door lock that unlocks the first car door leaf.

12. The method according to claim 11 further comprising steps of:

inserting a key into the shaft door lock;

turning the key in the shaft door lock; and unlocking the car door by the actuator actuating the emergency unlocking mechanism by turning the key.

13. The method according to claim 12 including turning the key in the shaft door lock by at least 20°.

14. The method according to claim 12 wherein the turning of the key directly causes a rotation of the actuator.

15. The method according to claim 11 including unlocking a second car door leaf of the car door by actuating the emergency unlocking mechanism.

* * * * *